United States Patent
Crosmer et al.

(10) Patent No.: US 7,676,608 B1
(45) Date of Patent: Mar. 9, 2010

(54) SYSTEM FOR EXTENDING MULTIPLE INDEPENDENT LEVELS OF SECURITY (MILS) PARTITIONING TO INPUT/OUTPUT (I/O) DEVICES

(75) Inventors: Julianne R. Crosmer, Cedar Rapids, IA (US); John G. Bendickson, Vinton, IA (US); Scott R. Gerhold, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 487 days.

(21) Appl. No.: 11/637,489

(22) Filed: Dec. 12, 2006

(51) Int. Cl.
*G06F 3/00* (2006.01)

(52) U.S. Cl. .............. 710/36; 710/62; 713/1; 713/2; 713/166

(58) Field of Classification Search .......... 710/36, 710/62; 713/166
See application file for complete search history.

(56) References Cited

U.S. PATENT DOCUMENTS

| | | | |
|---|---|---|---|
| 6,330,656 B1* | 12/2001 | Bealkowski et al. | 712/13 |
| 6,665,759 B2* | 12/2003 | Dawkins et al. | 710/200 |
| 7,073,002 B2* | 7/2006 | Armstrong et al. | 710/107 |
| 7,177,961 B2* | 2/2007 | Brice et al. | 710/36 |
| 2005/0216716 A1* | 9/2005 | Hoffman et al. | 713/1 |
| 2006/0085573 A1* | 4/2006 | Pike et al. | 710/36 |
| 2007/0255865 A1* | 11/2007 | Gaither | 710/36 |

* cited by examiner

*Primary Examiner*—Henry W. H. Tsai
*Assistant Examiner*—Elias Mamo
(74) *Attorney, Agent, or Firm*—Matthew J. Evans; Daniel M. Barbieri

(57) ABSTRACT

The present invention is a system for providing Multiple Independent Levels of Security (MILS) partitioning. The system includes a memory, a bus controller communicatively coupled to the memory via a memory bus, and a MILS controller communicatively coupled to the bus controller via a host-side bus, the MILS controller configured for monitoring and controlling system transactions. The system further includes a plurality of input/output (I/O) devices communicatively coupled to the MILS controller via a plurality of corresponding device-side buses. The system further includes a MILS separation kernel configured for mapping regions of the memory to a plurality of user partitions. Each I/O device included in the plurality of I/O devices is allocated to a partition included in the plurality of partitions and is isolated from MILS separation kernel space. The MILS separation kernel is configured for guaranteeing isolation of the partitions of the memory. The system further includes a processor connected to the bus controller via a processor front-side bus. The MILS controller is configured for extending MILS partitioning to the plurality of I/O devices.

19 Claims, 2 Drawing Sheets

SYSTEM FOR EXTENDING MULTIPLE INDEPENDENT LEVELS OF SECURITY (MILS) PARTITIONING TO INPUT/OUTPUT (I/O) DEVICES

FIELD OF THE INVENTION

The present invention relates to the field of computing systems and particularly to a system for extending Multiple Independent Levels of Security (MILS) partitioning to input/output (I/O) devices.

BACKGROUND OF THE INVENTION

Many computing environments process and transmit information having different security classification levels. For example, military computing environments process classified information having security levels such as top secret and secret, as well as unclassified information. Typically, unclassified information is separated from classified information in these computing environments, so that classified information is not improperly passed to an unsecured computing environment. Keeping unclassified information separated from classified information has dictated separate processing environments and interconnection networks, such as separate black processing environments for processing unclassified or encrypted data, and red processing environments for processing unencrypted classified data.

Partitioned processing environments have been developed that enable single processors to host Multiple Independent Levels of Security (MILS). For example, the AAMP7G processor manufactured by Rockwell Collins of Cedar Rapids, Iowa utilizes a National Security Agency (NSA) certified brickwall Partition Management Unit (PMU) to enforce separation of processes, while a MILS Real Time Operating System (RTOS) provides process separation with a software implemented partitioning environment, which can operate on Commercial Off-The-Shelf (COTS) processors.

In current MILS systems, the operating system may provide separation assurance (ex.—create distinct partitions) utilizing the processor's Memory Management Unit (MMU). However, memory protection provided by such partitioning is only effective for processor-originated actions (ex.—execute, read, write). Thus, the remainder of the MILS system, including all connected Input/Output (I/O) devices, is/are not controlled by the operating system's partitioning activities. This may be problematic in situations where the I/O devices are high capacity I/O devices and require Direct Memory Access (DMA) to operate. During DMA operations, data may be transferred from main memory to an I/O device via a bus, without passing the data through the processor (i.e., CPU). Essentially, the I/O device becomes the "bus master" and may place an arbitrary address on the bus, making it possible for the I/O device to read or write anywhere in system memory. Although some bus controllers may be able to protect some memory regions during DMA operations, they may not necessarily be able to restrict access to a partition's memory when multiple I/O devices on the same bus are utilizing DMA. Further complicating matters is that DMA operations during time critical partitions may take away precious processor cycles when the I/O device controls the memory bus.

Thus, it would be desirable to provide a system for providing Multiple Independent Levels of Security (MILS) partitioning which addresses the problems associated with current solutions.

SUMMARY OF THE INVENTION

Accordingly, an embodiment of the present invention is directed to a system for providing Multiple Independent Levels of Security (MILS) partitioning, the system including: a memory; a bus controller communicatively coupled to the memory via a memory bus; a MILS controller communicatively coupled to the bus controller via a host-side bus, the MILS controller configured for monitoring and controlling system transactions; a plurality of input/output (I/O) devices communicatively coupled to the MILS controller via a plurality of corresponding device-side buses; a MILS separation kernel configured for mapping regions of the memory to a plurality of user partitions, each I/O device included in the plurality of I/O devices being allocated to a partition included in the plurality of partitions and being isolated from MILS separation kernel space, the MILS separation kernel further configured for guaranteeing isolation of the partitions of the memory; and a processor connected to the bus controller via a processor front-side bus; wherein the MILS controller is configured for extending MILS partitioning to the plurality of I/O devices.

A further embodiment of the present invention is directed to a system for providing Multiple Independent Levels of Security (MILS) partitioning, the system including: a memory; a bus controller communicatively coupled to the memory via a memory bus; a MILS controller communicatively coupled to the bus controller via a host-side bus, the MILS controller configured for monitoring and controlling system transactions; a plurality of input/output (I/O) devices communicatively coupled to the MILS controller via a plurality of corresponding device-side buses; a MILS separation kernel configured for mapping regions of the memory to a plurality of user partitions, each I/O device included in the plurality of I/O devices being allocated to a partition included in the plurality of partitions and being isolated from MILS separation kernel space, the MILS separation kernel further configured for guaranteeing isolation of the partitions of the memory; and a processor connected to the bus controller via a processor front-side bus, the processor configured for identifying an active partition included in the plurality of partitions for regulating memory and time access for DMA transactions, wherein the MILS controller is configured for extending MILS partitioning to the plurality of I/O devices, the MILS controller being further configured for tracking memory regions allowed for DMA operations for each I/O device included in the plurality of I/O devices.

An additional embodiment of the present invention is directed to a system for providing Multiple Independent Levels of Security (MILS) partitioning, the system including: a memory; a bus controller communicatively coupled to the memory via a memory bus; a MILS controller communicatively coupled to the bus controller via a host-side bus, the MILS controller configured for monitoring and controlling system transactions; a plurality of input/output (I/O) devices communicatively coupled to the MILS controller via a plurality of corresponding device-side buses; a MILS separation kernel configured for mapping regions of the memory to a plurality of user partitions, each I/O device included in the plurality of I/O devices being allocated to a partition included in the plurality of partitions and being isolated from MILS separation kernel space, the MILS separation kernel further configured for guaranteeing isolation of the partitions of the memory; and a processor connected to the bus controller via a processor front-side bus, wherein the MILS controller is configured for extending MILS partitioning to the plurality of I/O devices and is not reconfigurable once initial configuration is complete.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
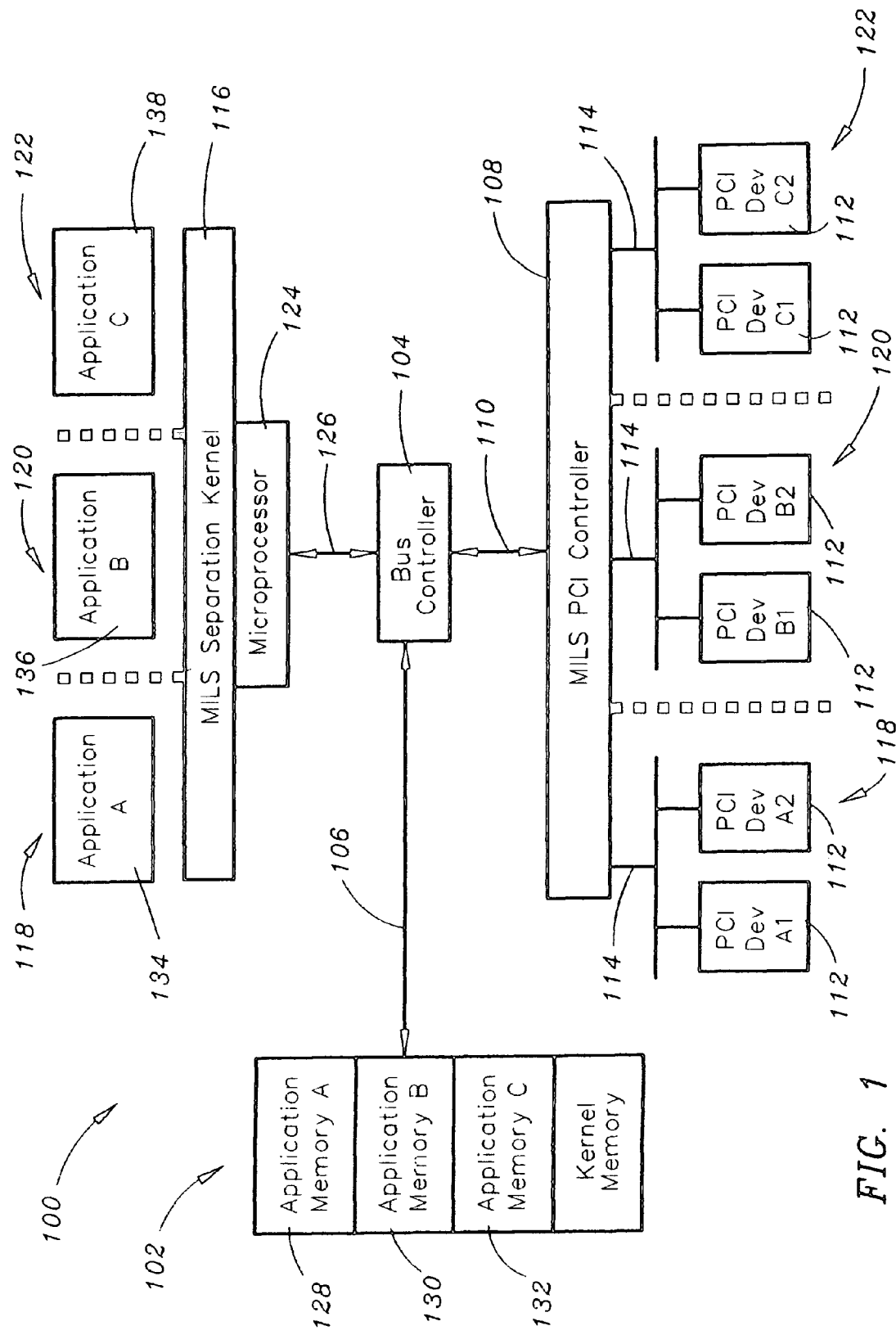
FIG. 1 is a block diagram of a MILS-partitioned system in accordance with an exemplary embodiment of the present invention.

FIG. 1 illustrates a block diagram configuration for a system 100 for providing Multiple Independent Levels of Security (MILS) partitioning in accordance with an exemplary embodiment of the present invention. In a present embodiment, the system 100 includes a memory 102. In further embodiments, the system 100 includes a bus controller 104. In exemplary embodiments, the bus controller 104 is communicatively coupled to the memory 102 via a memory bus 106. In additional embodiments, the system 100 includes a MILS controller 108. In exemplary embodiments, the MILS controller 108 is communicatively coupled to the bus controller 104 via a host-side bus 110. In additional embodiments, the MILS controller 108 is configured for monitoring and controlling system transactions.

In current embodiments, the system 100 further includes a plurality of input/output (I/O) devices 112. For instance, one or more of the I/O devices 112 may be a network, a disc, a keyboard, a mouse, a printer, a CD-ROM or the like. In exemplary embodiments, the I/O devices 112 are communicatively coupled to the MILS controller 108 via a plurality of corresponding device-side buses 114. In further embodiments, the system 100 includes an operating system kernel, such as a MILS separation kernel 116. In exemplary embodiments, the MILS separation kernel 116 is configured for mapping regions (128, 130, 132) of the memory 102 to a plurality of user partitions (118, 120 and 122). For example, the MILS separation kernel 116 may be configured for dividing the system 100 into separate address spaces and scheduling intervals. In additional embodiments, each I/O device 112 included in the plurality of I/O devices is allocated to a partition (ex—a user partition) included in the plurality of partitions (118, 120, 122) and made accessible when a memory region (128, 130 and/or 132) corresponding to the I/O device 112 is mapped to the I/O device's partition by the MILS separation kernel 116. Further, each I/O device 112 included in the plurality of I/O devices is isolated from MILS separation kernel space 116. In alternative embodiments, each I/O device 112 included in the plurality of I/O devices may belong to the MILS separation kernel space 116. In still further embodiments, the MILS separation kernel 116 is configured for guaranteeing isolation of the partitions (118, 120, 122) of the memory 102. Further, the MILS separation kernel may be configured for supporting carefully controlled communication between the partitions (118, 120, 122). Due to the fact that the MILS separation kernel 116 performs the very specific set of functions described above, its source code may be relatively small (ex—approx. 4,000 lines of C language code). Because of the critical role the MILS separation kernel plays in providing system security as described above, it typically requires the highest level of certification/authentication. For instance, the MILS separation kernel may be software and may further be the only system software which runs in privileged mode. Because the MILS separation kernel's amount of source code may be relatively small, formal mathematical verification to the necessary high levels of certification may be much easier to accomplish. In present embodiments, the system 100 includes a processor 124. In exemplary embodiments, the processor 124 is connected to the bus controller 104 via a processor front-side bus 126.

Figure 2:
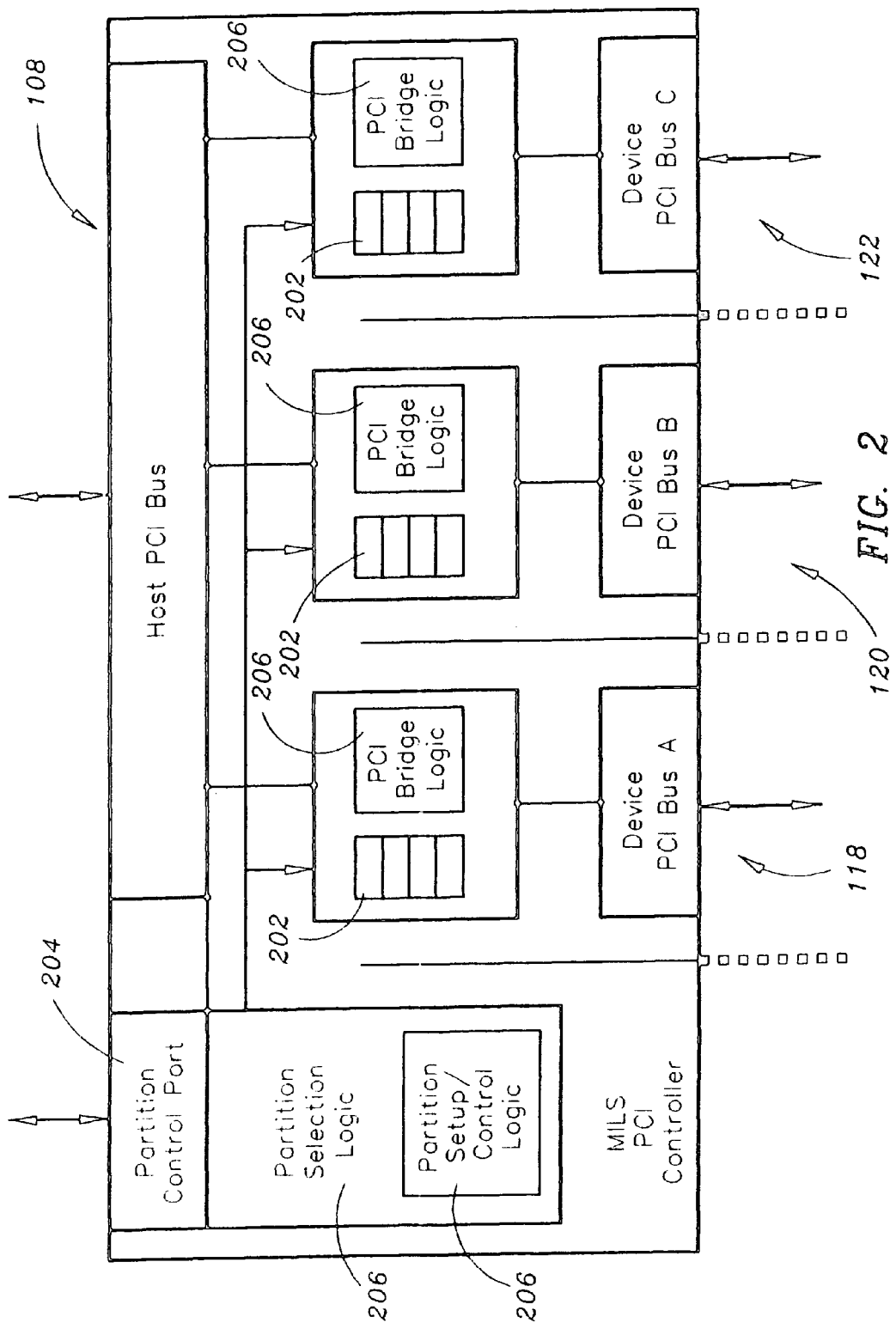
FIG. 2 is a block diagram illustrating a MILS controller for implementation with the MILS-partitioned system of FIG. 1, in accordance with an exemplary embodiment of the present invention.

Referring generally to FIG. 2, a block diagram illustrating a MILS controller 108 for implementation with the MILS-partitioned system 100 of FIG. 1, in accordance with an exemplary embodiment of the present invention is shown. In a present embodiment, the MILS controller 108 includes base address registers (BARs) 202. In exemplary embodiments, the BARs 202 are configured for allocation to an I/O device 112 included in the plurality of I/O devices, the I/O device being located downstream from the MILS controller 108. In further embodiments, the BARs 202 may be configured for controlling memory address acceptance (i.e., which memory address will be accepted) when the I/O device 112 initiates a transaction, such as a Direct Memory Access (DMA) transaction. In still further embodiments, the BARs 202 may be Partition Access base address registers.

In current embodiments, the MILS controller 108 is configured for isolating the plurality of device-side buses 114 both logically and electrically. For instance, no I/O device 112 is able to view transactions on another I/O device's bus 114. In further embodiments, the MILS controller 108 is not reconfigurable once initial configuration is complete (ex—no downstream I/O device 112 is allowed to affect the MILS controller's configuration). In additional embodiments, the MILS controller 108 is configured for implementation with a PCI bus, a PCIe (PCI Express) bus, or the like. In still further embodiments, the MILS controller 108 is configured or is settable by an auxiliary port 204 or a PCI configuration cycle. In exemplary embodiments, the MILS controller 108 is configured for preventing DMA transactions during a partition time slice when an active partition included in the plurality of partitions 112 requests that DMA transactions not be permitted.

In present embodiments, the MILS controller 108 is configured for sending an alert via a host PCI bus 110, an auxiliary control port 204, or a partition control port when a fault or an access violation is detected in a device bus transaction, such as in a misbehaved device bus transaction. In further embodiments, the MILS controller 108 is configured (ex.—may be controlled by the MILS separation kernel 116 and setup/implemented) for preventing a rogue partition or a rogue I/O device from reading or modifying data outside of an allocated range. In additional embodiments, the MILS controller 108 may be a PCI-to-PCI (P2P) bridge configured for connecting a first PCI bus 110 to a second PCI bus 114. In still further embodiments, the MILS controller 108 includes partition-aware control logic 206. For example, the partition-aware control logic 206 may be embedded and may be configured for monitoring/controlling system transactions that flow through. In exemplary embodiments, the partition-aware control logic 206 is configured for controlling/governing activity, such as DMA operations, of an I/O device 112 included in the plurality of I/O devices in time and memory space with respect to partitioning in the MILS separation kernel 116 and according to a partition (118, 120, 122) to which the I/O device belongs, the I/O device being located downstream from the MILS controller 108. In this way, the MILS controller 108 is configured for extending MILS partitioning to the plurality of I/O devices 112.

In current embodiments, a device driver for an I/O device included in the plurality of I/O devices is located in a partition (ex.—a user partition) included in the plurality of user partitions (118, 120, 122) the partition being allocated to the I/O device, and the device driver being isolated from MILS separation kernel space 116. This may result in avoiding costly additions to the High Assurance (HA) codebase certification of the system 100, since device drivers for I/O devices 112 in the system 100 of the present invention may no longer have to be certified to the same level as the MILS separation kernel 116 itself. Placing a device driver for an I/O device 112 (and the I/O device) in a partition (118, 120 or 122) with the I/O device may also considerably reduce the risk of potential corruption of the system as compared to systems where the driver exists in kernel space. In further embodiments, the MILS separation kernel 116 is configured for mapping an I/O device memory region (128, 130, 132) of the memory 102 to a partition included in the plurality of partitions (118, 120, 122). In additional embodiments, one or more applications (134, 136, 138) corresponding to the plurality of I/O devices 112 may be allocated to one or more partitions included in the plurality of partitions (118, 120, 122), the one or more partitions being allocated to one or more I/O devices 112 included in the plurality of I/O devices 112 and one or more memory regions (128, 130, 132) corresponding to the one or more I/O devices 112 included in the plurality of I/O devices.

In further embodiments, the processor 124 is configured for identifying an active partition included in the plurality of partitions (118, 120, 122) for regulating memory and time access for system transactions, such as DMA transactions or operations. For example, the MILS controller 108 may have provision for the processor 124 to identify an active partition included in the plurality of partitions (118, 120, 122) for regulating memory and time access for system transactions, such as DMA transactions or operations.

In additional embodiments, the MILS controller 108 is further configured for tracking memory regions (128, 130, 132) allowed for DMA operations for each I/O device included in the plurality of I/O devices, such as an I/O device which is located downstream from the MILS controller.

Implementation of the MILS controller 108 in the system 100 of the present invention may be advantageous in that it allows for any off-the-shelf device, such as an I/O device 112, to be used on an I/O bus 114 in the High Assurance (HA) (ex.—MILS partitioned) system 100, thereby allowing the I/O device 112 to operate as it would in an ordinary, low or medium assurance system. For example, the I/O device 112 may be allowed access to any system resource provided to it by an operating system of the MILS system 100.

In further embodiments, the present invention may be implemented in the CH53k or CSAR-X Block 10 programs or the like.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system for providing Multiple Independent Levels of Security (MILS) partitioning, the system comprising:
   a memory;
   a bus controller communicatively coupled to the memory via a memory bus;
   a MILS controller communicatively coupled to the bus controller via a host-side bus, the MILS controller configured for monitoring and controlling system transactions;
   a plurality of input/output (I/O) devices communicatively coupled to the MILS controller via a plurality of corresponding device-side buses;
   a MILS separation kernel, the MILS separation kernel being embodied in a computer-readable medium having computer-executable instructions to be executed by the system for mapping regions of the memory to a plurality of user partitions, each I/O device included in the plurality of I/O devices being allocated to a partition included in the plurality of partitions and being isolated from MILS separation kernel space, the MILS separation kernel further including computer-executable instructions to be executed by the system for guaranteeing isolation of the partitions of the memory and
   a processor connected to the bus controller via a processor front-side bus,
   wherein the MILS controller is configured for extending MILS partitioning to the plurality of I/O devices, the MILS controller being further configured for preventing DMA transactions during a partition time slice when an active partition included in the plurality of partitions requests that DMA transactions not be permitted.

2. A system as claimed in claim 1, wherein the MILS controller includes base address registers (BARs) configured for allocation to an I/O device included in the plurality of I/O devices, the I/O device being located downstream from the MILS controller, the BARs being further configured for controlling memory address acceptance when the I/O device initiates a DMA transaction.

3. A system as claimed in claim 2, wherein the base address registers (BARs) are Partition Access base address registers.

4. A system as claimed in claim 1, wherein the MILS controller is configured for isolating the plurality of device-side buses logically and electrically.

5. A system as claimed in claim 1, wherein the MILS controller is not reconfigurable once initial configuration is complete.

6. A system as claimed in claim 1, wherein the MILS controller is configured for implementation with at least one of: a PCI bus and a PCIe (PCI Express) bus.

7. A system as claimed in claim 1, wherein the MILS controller is configured by at least one of: an auxiliary port and a PCI configuration cycle.

8. A system for providing Multiple Independent Levels of Security (MILS) partitioning, the system comprising:
   a memory;
   a bus controller communicatively coupled to the memory via a memory bus;
   a MILS controller communicatively coupled to the bus controller via a host-side bus, the MILS controller configured for monitoring and controlling system transactions;
   a plurality of input/output (I/O) devices communicatively coupled to the MILS controller via a plurality of corresponding device-side buses;
   a MILS separation kernel, the MILS separation kernel being embodied in a computer-readable medium having computer-executable instructions to be executed by the system for mapping regions of the memory to a plurality of user partitions, each I/O device included in the plurality of I/O devices being allocated to a partition included in the plurality of partitions and being isolated from MILS separation kernel space, the MILS separation kernel further including computer-executable instructions to be executed by the system for guaranteeing isolation of the partitions of the memory and
   a processor connected to the bus controller via a processor front-side bus, the processor configured for identifying an active partition included in the plurality of partitions for regulating memory and time access for DMA transactions,
   wherein the MILS controller is configured for extending MILS partitioning to the plurality of I/O devices, the MILS controller being further configured for tracking memory regions allowed for DMA operations for each I/O device included in the plurality of I/O devices the MILS controller being further configured for preventing DMA transactions during a partition time slice when an active partition included in the plurality of partitions requests that DMA transactions not be permitted.

9. A system as claimed in claim 8, wherein the MILS controller is configured for sending an alert via at least one of: a host PCI bus; an auxiliary control port; and a partition control port when at least one of: a fault and an access violation is detected in a device bus transaction.

10. A system as claimed in claim 8, wherein the MILS controller is configured for preventing at least one of: a rogue partition; and a rogue I/O device from at least one of: reading data outside of an allocated range; and modifying data outside of an allocated range.

11. A system as claimed in claim 8, wherein the MILS controller is a PCI-to-PCI (P2P) bridge configured for connecting a first PCI bus to a second PCI bus.

12. A system as claimed in claim 8, wherein the MILS controller includes partition-aware control logic for controlling activity of an I/O device included in the plurality of I/O devices in time and memory space with respect to partitioning in the MILS separation kernel and according to a partition to which the I/O device belongs, the I/O device being located downstream from the MILS controller.

13. A system as claimed in claim 12, wherein the activity is a Direct Memory Access (DMA) operation.

14. A system as claimed in claim 8, wherein a device driver for an I/O device included in the plurality of I/O devices is located in a user partition included in the plurality of user partitions, the user partition being allocated to the I/O device, and the device driver being isolated from MILS separation kernel space.

15. A system as claimed in claim 8, wherein the MILS separation kernel is configured for mapping an I/O device memory region of the memory to a partition included in the plurality of partitions.

16. A system for providing Multiple Independent Levels of Security (MILS) partitioning, the system comprising:
   a memory;
   a bus controller communicatively coupled to the memory via a memory bus;
   a MILS controller communicatively coupled to the bus controller via a host-side bus, the MILS controller configured for monitoring and controlling system transactions;
   a plurality of input/output (I/O) devices communicatively coupled to the MILS controller via a plurality of corresponding device-side buses;
   a MILS separation kernel, the MILS separation kernel being embodied in a computer-readable medium having computer-executable instructions to be executed by the system for mapping regions of the memory to a plurality of user partitions, each I/O device included in the plurality of I/O devices being allocated to a partition included in the plurality of partitions and being isolated from MILS separation kernel space, the MILS separation kernel further including computer-executable instructions to be executed by the system for guaranteeing isolation of the partitions of the memory and
   a processor connected to the bus controller via a processor front-side bus,
   wherein the MILS controller is configured for extending MILS partitioning to the plurality of I/O devices and is not reconfigurable once initial configuration is complete, the MILS controller being further configured for preventing DMA transactions during a partition time slice when an active partition included in the plurality of partitions requests that DMA transactions not be permitted.

17. A system as claimed in claim 16, wherein the MILS controller includes base address registers (BARs) configured for allocation to an I/O device included in the plurality of I/O devices, the I/O device being located downstream from the MILS controller, the BARs being further configured for controlling memory address acceptance when the I/O device initiates a DMA transaction.

18. A system as claimed in claim 16, wherein the MILS controller is configured for preventing at least one of: a rogue partition; and a rogue I/O device from at least one of: reading data outside of an allocated range; and modifying data outside of an allocated range.

19. A system as claimed in claim 16, wherein the MILS controller includes partition-aware control logic for controlling activity of an I/O device included in the plurality of I/O devices in time and memory space with respect to partitioning in the MILS separation kernel and according to a partition to which the I/O device belongs, the I/O device being located downstream from the MILS controller.

* * * * *